United States Patent
Colegrove

[19]

[11] Patent Number: 6,109,638
[45] Date of Patent: Aug. 29, 2000

[54] HONEYCOMB REINFORCED COMPOSITE FIBER BICYCLE FRAME

[75] Inventor: James E. Colegrove, Lake Mills, Wis.

[73] Assignee: Trek Bicycle Corporation, Waterloo, Wis.

[21] Appl. No.: 09/094,331

[22] Filed: Jun. 9, 1998

[51] Int. Cl.$^7$ .................................................. B62K 15/00
[52] U.S. Cl. ..................... 280/288.3; 280/281.1
[58] Field of Search .............. 280/288.3, 281.1; 264/257, 258; 156/245, 293

[56] References Cited

U.S. PATENT DOCUMENTS

| | | | |
|---|---|---|---|
| 3,673,058 | 6/1972 | Jackson et al. ............. | 161/68 |
| 4,230,332 | 10/1980 | Porsche ..................... | 280/281 |
| 4,598,007 | 7/1986 | Kourtides et al. ......... | 428/116 |
| 5,072,961 | 12/1991 | Huppe ....................... | 280/278 |
| 5,078,818 | 1/1992 | Han et al. ................. | 156/89 |
| 5,087,500 | 2/1992 | Kasper et al. ............. | 428/116 |
| 5,106,668 | 4/1992 | Turner et al. ............. | 428/116 |
| 5,215,322 | 6/1993 | Enders ...................... | 280/231 |
| 5,238,725 | 8/1993 | Effing et al. ............. | 428/116 |
| 5,271,879 | 12/1993 | Saatchi et al. ........... | 264/46.5 |
| 5,316,604 | 5/1994 | Fell .......................... | 156/82 |
| 5,456,481 | 10/1995 | Allsop et al. ............. | 280/281.1 |
| 5,460,865 | 10/1995 | Tsotsis ...................... | 428/116 |
| 5,624,519 | 4/1997 | Nelson et al. ............. | 156/245 |
| 5,635,273 | 6/1997 | Dixon et al. .............. | 428/116 |
| 5,685,553 | 11/1997 | Wilcox et al. ............. | 280/283 |
| 5,876,054 | 3/1999 | Olson et al. .............. | 280/281.1 |

*Primary Examiner*—J. J. Swann
*Assistant Examiner*—Michael Cuff
*Attorney, Agent, or Firm*—Boyle Fredrickson Ziolkowski S.C.

[57] ABSTRACT

A composite bicycle frame having at least a portion of the frame walls reinforced with an internal layer of honeycomb material is presented. The honeycomb material is essentially sandwiched between interior and exterior sections of the frame wall, with the interior and exterior sections of the frame wall each being comprised of a plurality of overlaid layers composite material. Each layer of composite material is comprised of a multiplicity of high strength, unidirectional carbon fibers embedded in an epoxy resin. Several layers of composite material are stacked on top of each other and arranged so that the fibers in one layer cross over the fibers in an adjacent layers. The layers are cut into shapes and molded together using a cavity mold and internal pressure bladder in order to construct a substantially hollow, unitary frame member.

30 Claims, 8 Drawing Sheets

HONEYCOMB REINFORCED COMPOSITE FIBER BICYCLE FRAME

BACKGROUND OF THE INVENTION

1. Field of the Invention

The present invention relates to bicycle frames and their method of manufacture. In particular, the invention relates to bicycle frames having frame walls which define a substantially hollow bicycle frame member made from a composite material wherein at least a portion of the frame wall is reinforced with a layer of synthetic honeycomb material sandwiched between several overlaid layers of unidirectional carbon fibers.

2. Discussion of the Related Art

Composite materials have been utilized in place of metal for frame construction in a number of applications. Such composite materials have a lower density, higher specific strength and stiffness, and better damping qualities than metals. Composite materials therefore normally provide an increase in frame strength and stiffness with a reduction in weight, as compared to metallic frames. Because of the natural desire to reduce the weight of bicycles, composite materials have also been used in the manufacture of bicycle frames.

One highly successful line of composite bicycle frames is the Trek Optimum Compaction Low Void (OCLV) series. The frame for a Trek OCLV 9000 mountain bike, for example, is formed by joining a set of composite tubes to a set of composite lugs. The tubes are those portions of the frame which form the top tube, down tube, seat tube, chain stays and seat stays. The lugs are the irregularly shaped portions of the frame which form the head lug, seat lug and bottom bracket lug. The lugs are preformed and pre-cured articles fabricated from a composite material comprised of overlaid layers of unidirectional carbon fibers embedded in an epoxy resin. Several layers of material are stacked on top of each other so that the fibers of adjacent layers cross over one another. The stacks of fibers are cut into shapes called preforms for molding into a particular lug. The preforms are placed in a mold and arranged around an inflatable bladder. The assembly of preforms is then heated and cured, with the bladder pressurized for urging the respective preforms into the shape of the mold. This method of fabrication provides a high laminate compaction having low voids which results in a strong, uniform, thin walled, tubular lug. The composite tubes may be formed by a similar method. The separate tubes and lugs are then glued together to construct the frame. Further details of this method of making an all-composite bicycle frame are disclosed in U.S. Pat. No. 5,624,519 assigned to the Trek Bicycle Corporation.

The above-described method for making composite lugs has also been used to make larger frame members, sometimes called large lugs, such as the Y-shaped frame shown in U.S. Pat. No. 5,685,553 also assigned to the Trek Bicycle Corporation. The Y-shaped frame is identified as reference numeral 12 in FIG. 1 of the '553 patent. Of course, a bicycle frame must be strong enough to support the rider's weight plus the force of bumps and jumps encountered during the ride. When a rider sits on the Y-bike or on other bicycles having similarly configured frames, the rider's weight is concentrated at the central portion or apex of the frame. When the rider applies his or her entire weight to the seat, the walls of the central portion of the Y-bike tend to bow outwardly, an effect referred to as "oil canning." The distortion of the frame walls in this manner is aesthetically undesirable and in extreme cases may lead to a failure in the frame structure. The distortion of the walls can be addressed to some degree by using a heavier grade of composite material or by adding additional layers of material to thicken the walls, but the added material obviously adds weight to the bicycle.

Of course, in the field of bicycles, and especially in the field of bicycle racing there is a never-ending desire to build ever lighter bicycles and bicycle frames.

SUMMARY OF THE INVENTION

A bicycle frame having a layer of honeycomb reinforcing material sandwiched between multiple layers of composite material is disclosed. The invention disclosed herein relates to both the frame itself and its method of manufacture.

The invention relates in particular to a bicycle frame and to a method of constructing a bicycle frame, wherein the bicycle frame is comprised of a unitary frame wall which defines a substantially hollow frame member, and at least a portion of the frame wall is reinforced with a layer of honeycomb material. Such reinforced portion of the frame wall is comprised of an exterior wall section, an interior wall section, and an intermediate layer of honeycomb reinforcing material sandwiched between the interior and exterior wall sections.

The exterior wall section is comprised of a plurality of overlaid layers of composite material. The individual layers of composite material are each comprised of a multiplicity of unidirectional, small diameter carbon fibers of high modulus and high tensile strength embedded in an epoxy resin matrix. Several layers of composite material are stacked on top of each other so that the fibers of any one layer in the stack cross over the fibers in adjacent layers. Preferably the fibers in one layer of composite material are aligned at about 45° to about 90° relative to the fibers in an adjacent layer. The stacks of composite material for the exterior wall section are cut into preforms of a predetermined shape for use in molding the frame member being constructed.

The interior wall section is likewise fabricated from preforms of overlaid layers of composite fibers which are cut into appropriate shapes for use on the reinforced portion of the frame wall. The honeycomb material is a synthetic fabric material comprised of a regular geometric pattern of wall segments.

The exterior preform, the layer of honeycomb material and the interior preform are layered and molded to form the bicycle frame member being constructed. The exterior preform is assembled in a mold so that it forms the outer surface of the frame wall. The honeycomb material and interior preform are assembled in the mold so that the layer of honeycomb material is sandwiched between the exterior and interior performs and so that the individual wall segments of the honeycomb material are oriented substantially perpendicular to the layers of composite material in the exterior and interior preforms.

The frame member is preferably made in halves which are molded together utilizing a cavity mold and an inflatable internal bladder. Two exterior preforms, each preform being shaped and sized to form approximately one half of the frame member being constructed, are molded together to form contiguous frame walls. As a result, the layer of honeycomb material and the interior wall section are assembled interior to the exterior wall section which forms the outer surface of the hollow frame member.

Although the addition of the honeycomb material adds a component not previously used in the construction of bicycle frames, its use permits a substantial reduction in the amount of carbon fiber used in building the frame, and consequently results in a substantial reduction in the overall weight of the frame. The resulting structure is an extremely light weight yet very rigid bicycle frame.

The primary objects of the invention are therefore to provide a composite bicycle frame that will not become appreciably deformed or distorted upon the application of normal riding forces; to provide a composite bicycle frame, and a process for its manufacture, which is extremely light in weight, stiff and strong; to provide a bicycle frame and its method of manufacture which is constructed from walls having an intermediate layer honeycombed reinforcing material sandwiched between two sets of overlaid layers of unidirectional carbon fibers; and to provide a composite bicycle frame which is lighter in weight and stiffer than previously known composite frames.

Other objects and advantages of the invention will become apparent from the following description which sets forth, by way of illustration and example, certain preferred embodiments of the invention.

BRIEF DESCRIPTION OF THE DRAWINGS

The drawings, which constitute a part of the specification and include exemplary embodiments of the present invention, include the following.

DETAILED DESCRIPTION OF THE PREFERRED EMBODIMENTS

The present invention is concerned with bicycle frames and bicycle frame members essentially of the composite type. The bicycle frame described below is for a traditional two-wheeled bicycle. In general, a bicycle frame performs several primary functions, including: providing a support for the bicycle wheels; providing a support for a mechanism for steering the bicycle; providing a support for a pedal mechanism that provides a mode of power for propelling the bicycle; providing a support for a seat; and providing a support for a braking mechanism. The frame 20 shown in the drawings in the present application is comparable to the Y-shaped frame disclosed in the applicant's U.S. Pat. No. 5,685,553, and is discussed herein merely as an exemplary frame that may be constructed by employing the principles of the invention. It is understood that a wide range of frame geometries may be constructed in accordance with the present invention.

Figure 1:
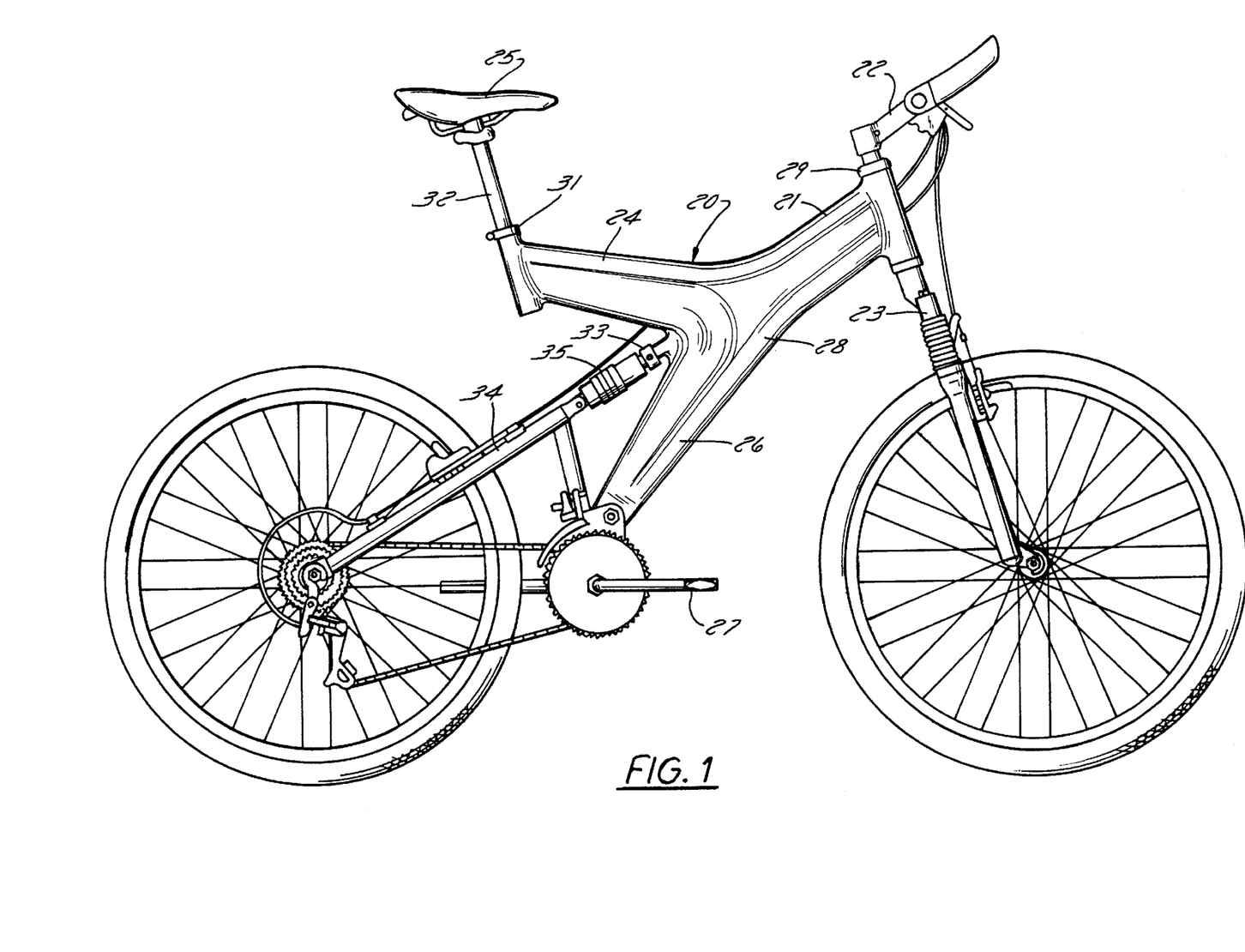
FIG. 1 is a side elevation view of a bicycle having a Y-shaped frame exemplary of the type of frame member in which the honeycomb reinforcement of the present invention may be employed.

The Y-shaped frame 20 shown in FIG. 1 has a head arm 21 which supports the handlebar 22 and front fork 23, a seat arm 24 which supports the seat 25, and a down arm 26 which supports the pedal mechanism 27. The head arm 21, seat arm 24 and down arm 26 diverge outwardly from a center or apex portion 28 of the frame 20. The head arm 21 extends forwardly from the apex portion 28 of the frame 20, and the seat arm 24 and down arm 26 extend rearwardly from the apex portion 28 of the frame 20.

Figure 13:
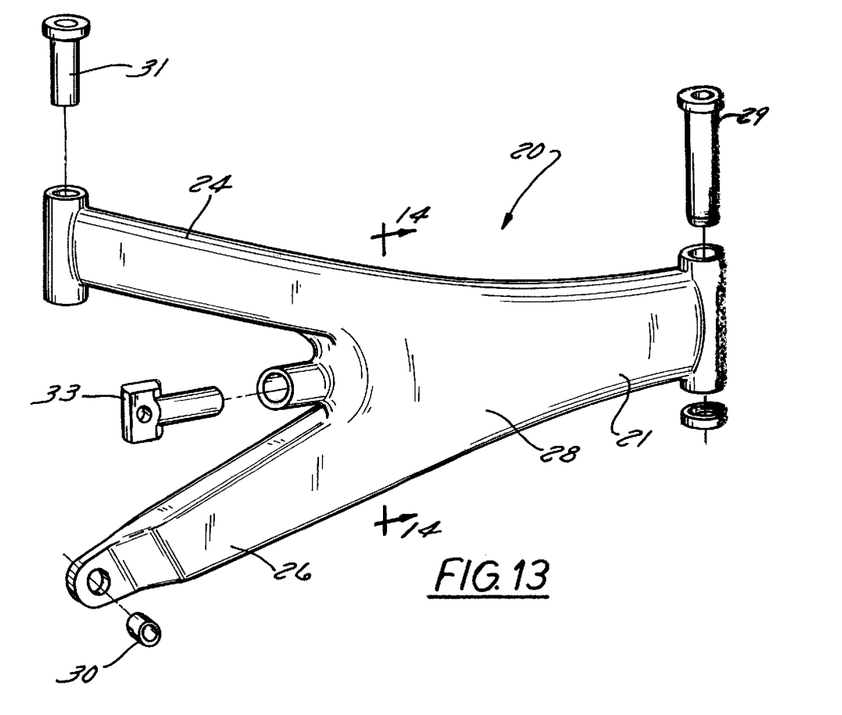
FIG. 13 is a perspective view of a completed bicycle frame member of the present invention illustrating also metallic inserts that are added to the frame for assembling additional components to complete the bicycle.
Figure 14:
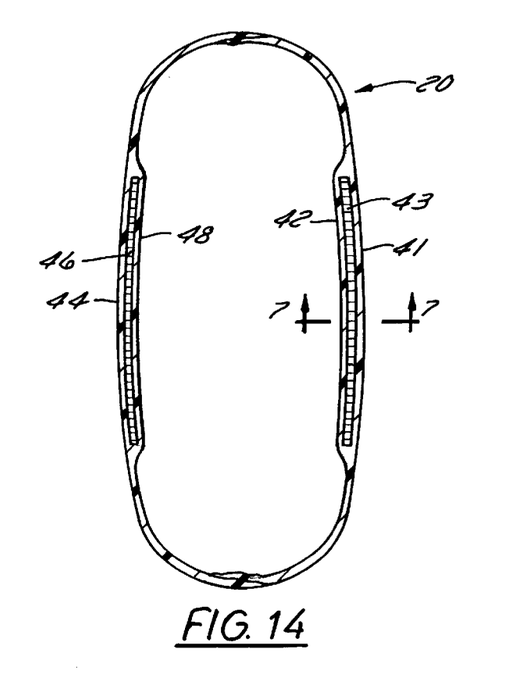
FIG. 14 is a cross section view of the bicycle frame member relative to line 14—14 of FIG. 13.

The frame member 20 of the present invention is generally hollow and free of metallic inserts, except for metal sleeves that may be needed for the attachment of external hardware, and even then such sleeves are not relied on for frame strengthening or reinforcement. Examples of such interior sleeves include a tubular sleeve 29 in the neck of the head arm 21 that supports the handlebar 22 and front fork 23, a bottom bracket 30 in the down arm 26 for the crank axle of the pedal mechanism 27, a seat lug 31 for the seat post 32, and for this particular bicycle an attachment 33 for the rear suspension 34 and shock absorber 35 as shown in FIGS. 1 and 13.

Figure 2:
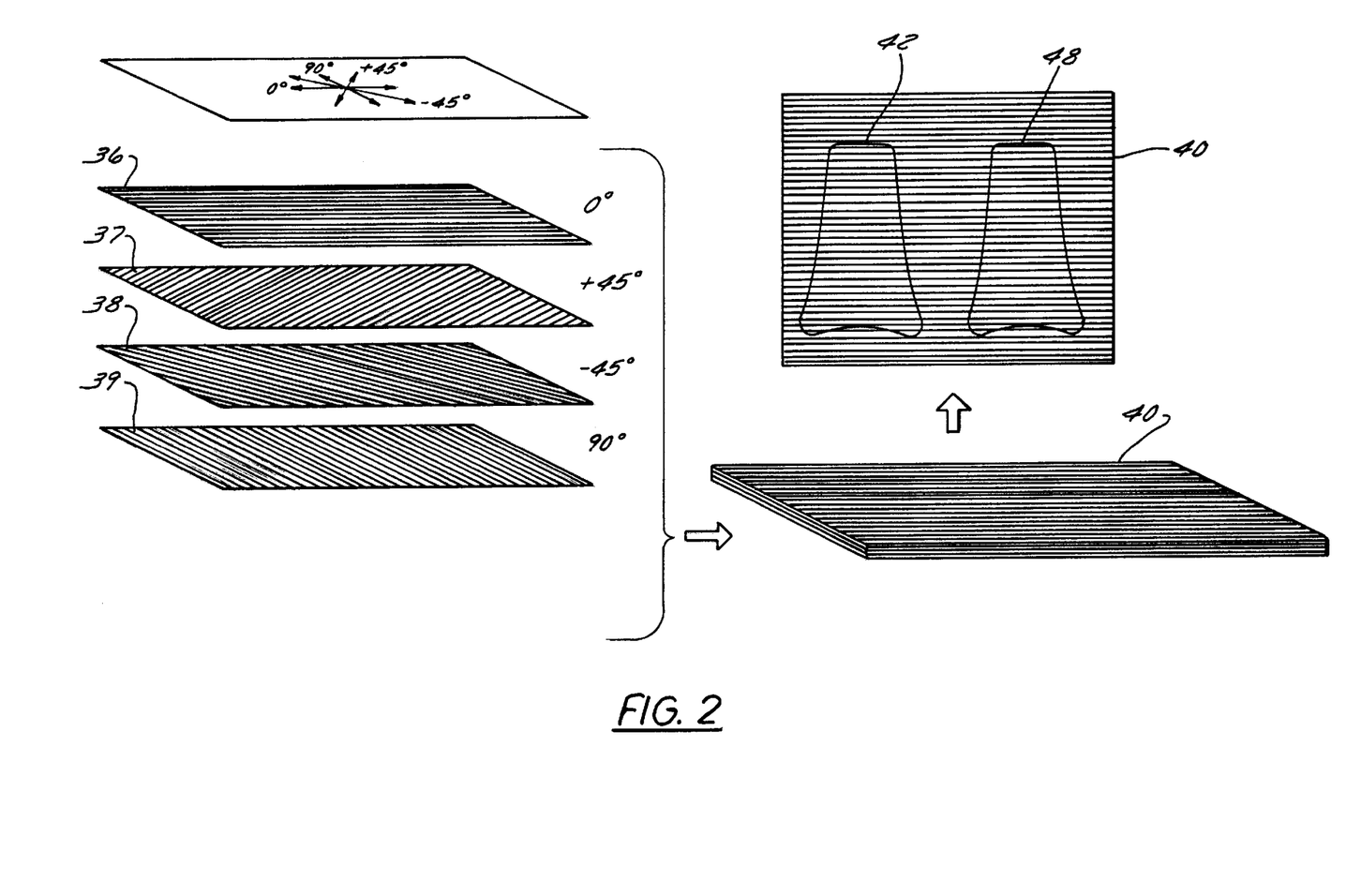
FIG. 2 is a flow schematic illustrating the process that is utilized to assemble uncured composite preforms (which are trimmed to a predetermined shape such as, for example, the interior overlay shown in FIG. 6) that are subsequently molded and cured as disclosed herein to produce the bicycle frame member of the invention.

The frame 20 of the present invention is comprised of a composite material. More specifically, the frame 20 is made from individual layers of a composite material with each individual layer being comprised of a multiplicity of unidirectional carbon fibers embedded in an epoxy resin. The fibers are preferably an aerospace grade of carbon fibers which are available from a number of sources, one such supplier being Hexel Inc., Pleasanton, Calif. Referring to FIG. 2, several individual layers 36, 37, 38 and 39 of composite material are laid over each other to form a mat or sheet 40 in which the fibers of one layer are oriented at different angles from the fibers in the layers immediately above and below so that the fibers in adjacent layers cross over each other. The layers are laid down so that the fibers of one layer are preferably oriented at about 45° to about 90° relative to an adjacent layer. The stacked layers 40 are then cut into various shapes for use in constructing the frame 20. The precut stack of fibers is referred to as a preform. Of course, additional details concerning the preferred composite materials to be used and the formation of the preforms are disclosed in applicant's U.S. Pat. No. 5,624,519, which is fully incorporated herein by reference.

In accordance with the principles of the present invention, the composite frame 20 is reinforced with a honeycomb material. As such, the reinforced portion of the frame 20 is comprised of an exterior wall section 41, an interior wall section 42, and an intermediate layer of honeycomb material 43 sandwiched between the exterior and interior wall sections.

Figure 3:
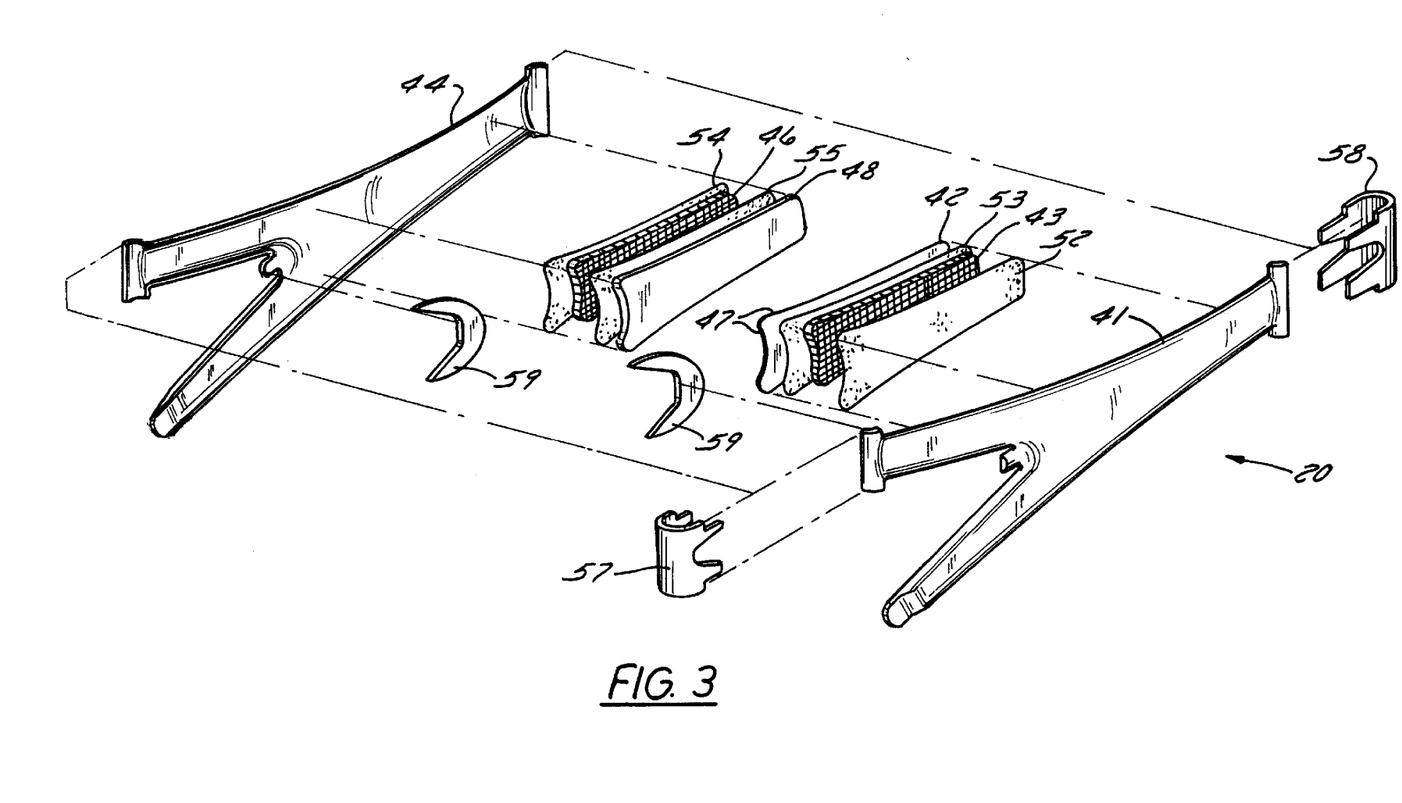
FIG. 3 is an exploded view of the various layers of material that are assembled and molded together to construct the bicycle frame member of the invention.

The exterior wall section 41 forms the exterior portion of the frame walls. As explained further below, the frame member 20 is comprised of two frame halves which are molded together to form a substantially hollow, unitary frame member. Referring to FIG. 3, the exterior portion of the frame member 20 is constructed from a first exterior preform 41 and a second exterior preform 44. More specifically, the frame member 20 is comprised of a first exterior preform 41 which forms substantially one half of the frame, and a second exterior preform 44 which forms substantially the other half of the frame. The exterior preforms 41 and 44 are cut and sized to a shape that substantially corresponds to the profile of the frame member 20 being manufactured. Of course, the shape of the exterior preforms depends on the desired shape of the frame member being manufactured.

Figures 4, 5, 6:
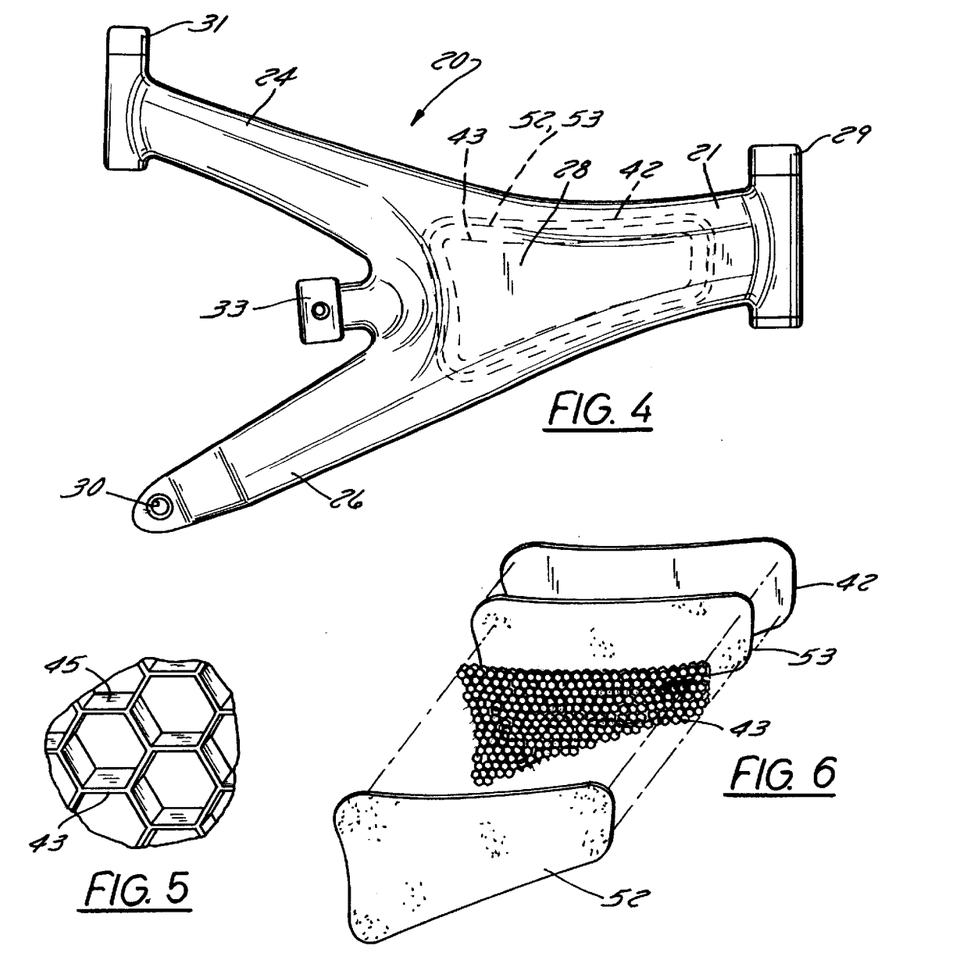
FIG. 4 is a side elevation view of the frame member of the invention.
FIG. 5 is a partial perspective view of a small section of honeycomb material.
FIG. 6 is a perspective view of the honeycomb material and interior overlay and also of the double-sided adhesive films which are applied to the reinforced portions of the frame walls.

Referring to FIGS. 5 and 6, the layer of honeycomb material 43 is comprised of a regular geometric pattern of wall segments 45. The material is preferably made from a lightweight synthetic or composite fabric such as Nomex aramid paper or other comparable synthetic material which is structurally different in kind from the individual layers of composite material. (Nomex is a registered trademark of the DuPont Company.) A suitable honeycomb material is also available from Hexel, Inc. as well as several other suppliers. The material is by itself quite flexible and therefore able to conform to some degree to irregular surfaces and shapes used in the construction of bicycle frames. As explained further below, the wall segments 45 which form the honeycomb pattern provide a plurality of cell structures which, when assembled and bonded to the layers of composite material in the manner described herein, provides a very rigid structure.

It is contemplated that the layer of honeycomb reinforcing material is to be used on at least those portions of the frame that are prone to distortion, which in the case of the Y-shaped frame 20 shown in FIG. 4 is the relatively large and flat central portion 28 of the frame. Of course, the invention disclosed herein for fabricating honeycomb reinforced composite frames may also be used to reinforce other portions of the frame depending on its particular configuration. In any event, a portion of honeycomb material 43 is cut and sized for application to an area of the frame to be reinforced. For the Y-bike shown here, the same area of the frame 20 is reinforced on both the right and left sides of the frame. Therefore, referring again to FIG. 3, a first portion of honeycomb material 43 is cut and sized for reinforcing a first area of the frame 20, and a second portion of honeycomb material 46 is cut and sized for reinforcing a second area of the frame 20.

The interior wall section 42 is likewise formed from a preform of composite material. That is, the interior preform 42 is comprised of several overlaid layers of unidirectional carbon fibers with the fibers of one layer being oriented at different angles from those fibers in the layers immediately above and below so that the fibers in adjacent layers cross over each other. The interior preform 42 covers over the honeycomb layer 43 so that the honeycomb layer 43 is essentially sandwiched between the interior preform 42 and exterior preform 41. In that sense, the interior preform 42 may be referred to as an interior overlay or doubler for the honeycomb material. The interior preform 42 is cut to a size and shape which is slightly larger than the size and shape of the honeycomb layer 43. The peripheral edges 47 of the interior preform 42 overhang the edges of the honeycomb material 43 so that during the molding and curing steps discussed below the epoxy resin in the peripheral edges 47 of the interior preform 42 become bonded to the epoxy resin in the exterior preform 41. As with the exterior preforms and honeycomb layers, there is for this particular frame construction a first interior preform 42 for covering over the first portion of honeycomb material 43 used for reinforcing the first area on the first half of the frame, and a second interior preform 48 for covering over the second portion of honeycomb material 46 used for reinforcing the second area on the second half of the frame.

Figure 8:
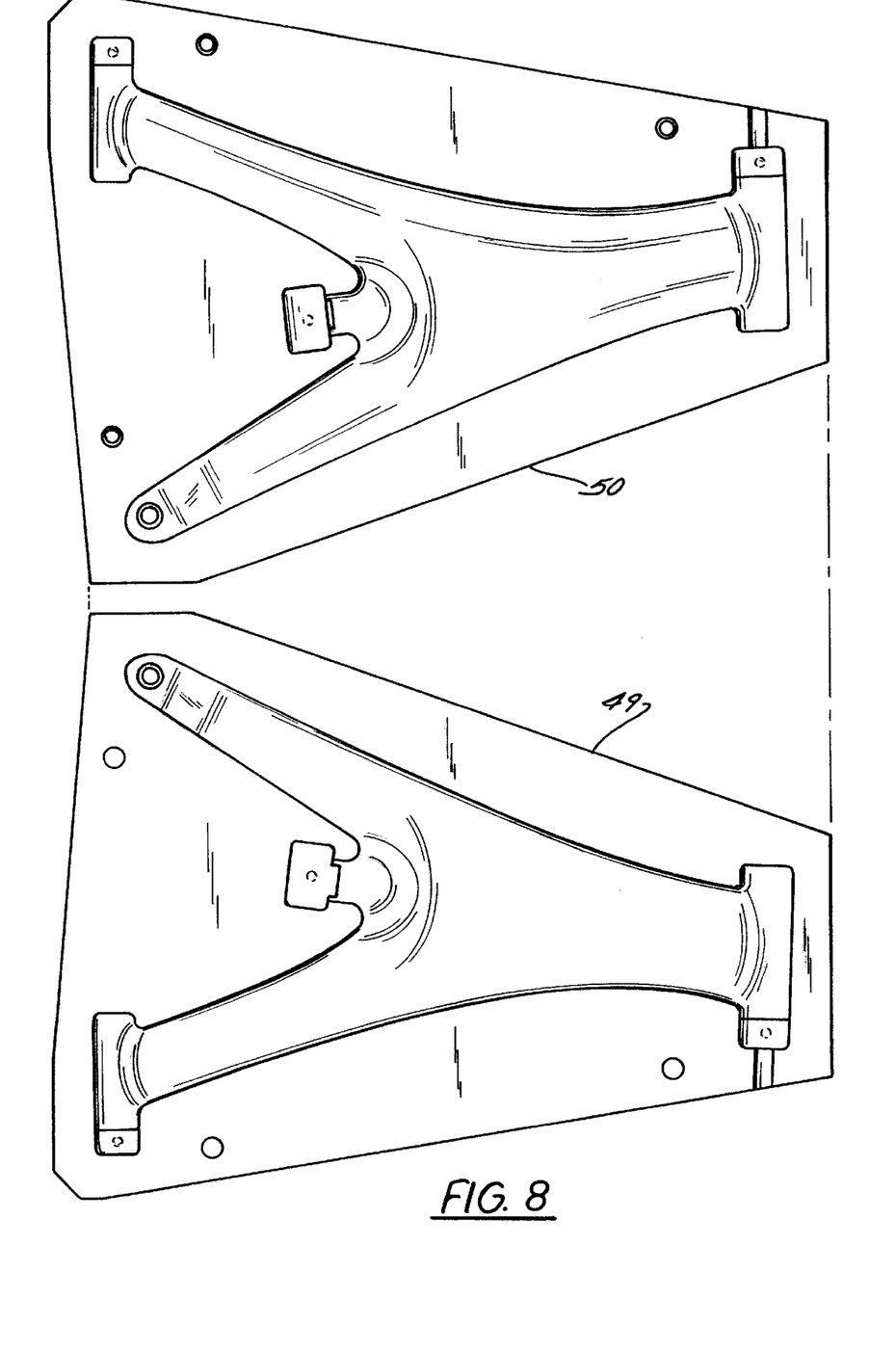
FIG. 8 is a top view of an open frame mold used for molding and curing frame members.
Figure 10:
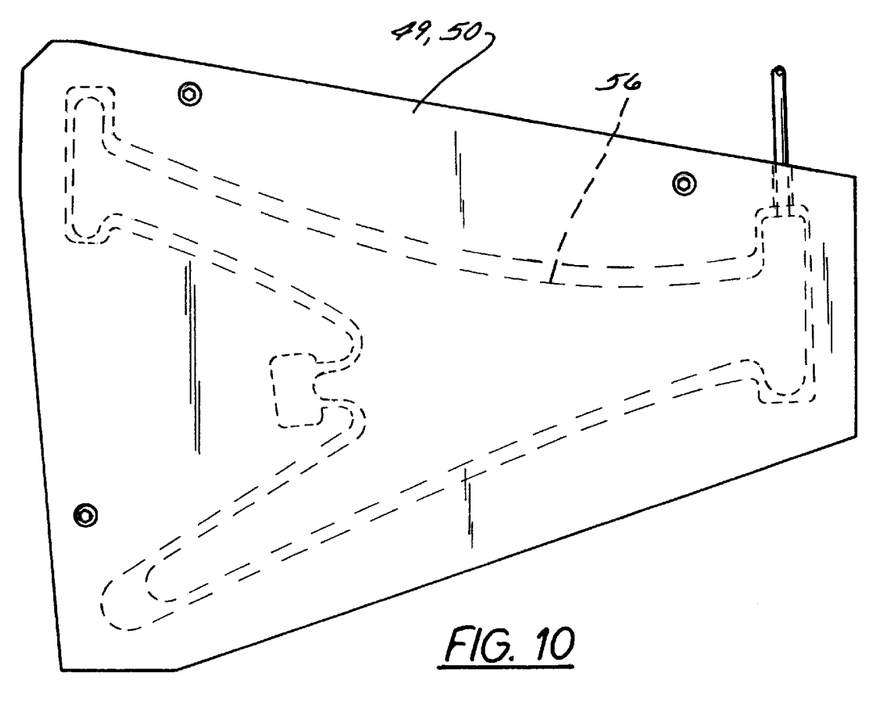
FIG. 10 is a top view of a closed frame mold with the bladder assembled in the mold cavity.
Figure 11:
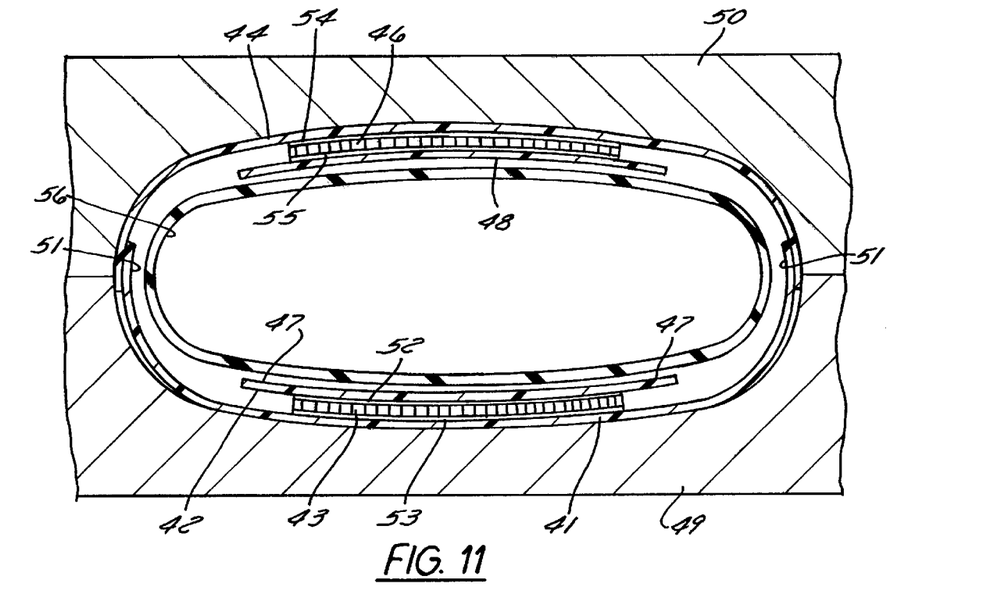
FIG. 11 is a cross section view illustrating a closed mold containing an uncured frame member and uninflated internal bladder.
Figure 12:
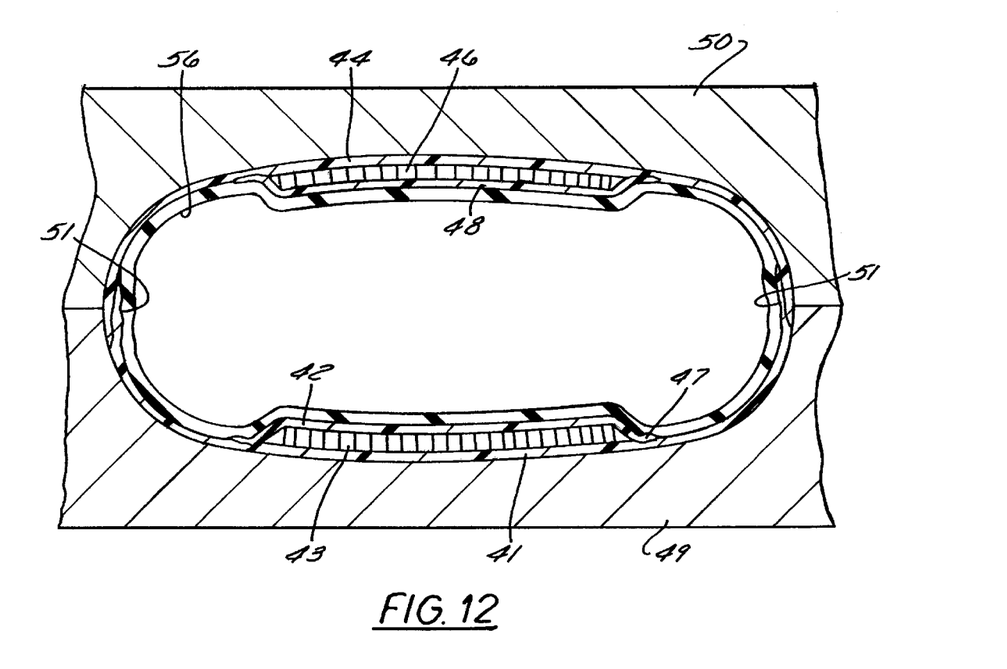
FIG. 12 is a cross section view illustrating a closed mold with the internal bladder inflated so that the various layers of material are compacted together and compacted against the cavity walls of the mold.

As shown in FIGS. 8 and 10, the frame member 20 is formed in matching female tooling molds. The two tooling mold halves 49 and 50 together form a mold cavity. Of course, the surface of the mold cavity defines the shape of the exterior surface of the frame member 20 being formed. As mentioned, the exterior portion of the frame walls is formed by the first and second exterior preforms 41 and 44. The first exterior preform 41 is inserted into the first mold half 49 and the second exterior preform 44 is inserted into the second mold half 50. As mentioned, the exterior preforms 41 and 44 are sized such that each preform forms approximately one-half of the frame member, plus a small overlapping portion 51 that laps over the edge of the other preform. As shown in FIGS. 11 and 12, the overlapping edges 51 are subsequently molded together during the curing process in order to form the frame member 20.

Figure 7:
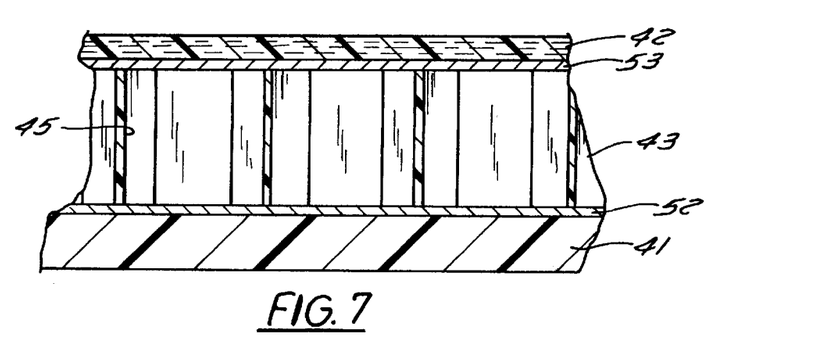
FIG. 7 is a sectional view of the frame wall relative to line 7—7 of FIG. 14.

After the first exterior preform 41 is placed into the first mold half 49 and fitted into the molding cavity, the first portion of honeycombed reinforcing material 43 is then laid over that portion of the first exterior preform 41 which is to be reinforced. As mentioned, the honeycomb material 43 is a material comprised of a regular geometric pattern of short wall segments 45. When applied to the exterior preform 41, the individual wall segments 45 of the honeycomb material 43 are oriented substantially perpendicular to the direction of the fibers in the exterior preform 41, and also substantially perpendicular to the fibers in the interior preform 42, as illustrated in FIG. 7.

The epoxy resin of the preform is naturally tacky, and may be tacky enough to provide enough adhesion to the honeycomb material. However, to ensure a strong adhesion of the honeycomb material 43 to the first exterior preform 41, a highly tacky adhesive may optionally be applied onto the exterior preform prior to the application of the honeycomb material. The adhesive may be comprised of a film or other substrate material 52 having adhesive on both sides. Thus, the layer of double sided adhesive film 52 is essentially sandwiched between the first exterior preform 41 and the layer of honeycomb material 43.

The first interior preform 42 of composite material is then placed over the layer of honeycomb reinforcing material 43. Consequently, the first portion of honeycomb material 43 is essentially sandwiched between the first exterior preform 41 and the first interior preform 42. Also, a second layer of double sided adhesive film 53 is preferably placed between the layer of honeycomb material 43 and the interior perform 42 to ensure that those two layers of material firmly adhere to each other.

The second half of the frame is built up in substantially the same manner. That is, the second exterior preform 44 is placed into the second mold half 50, a layer of double sided adhesive film 54 is then applied over that portion of the second exterior preform 44 which is to be reinforced, the second portion of honeycomb material 46 is placed onto the adhesive film 54 which is on the second exterior preform 44, another layer of adhesive film 55 is applied over the second portion of honeycomb material 46, and the second interior preform 48 is placed over the adhesive film 55 covering the layer of honeycomb material 46. The peripheral edges of the second interior preform 48 also overhang the edges of the honeycomb material 46 and subsequently become bonded to the second exterior preform 44. Consequently, the second portion of honeycomb material 46 is likewise sandwiched between the second exterior preform 44 and the second interior preform 48.

Figure 9:
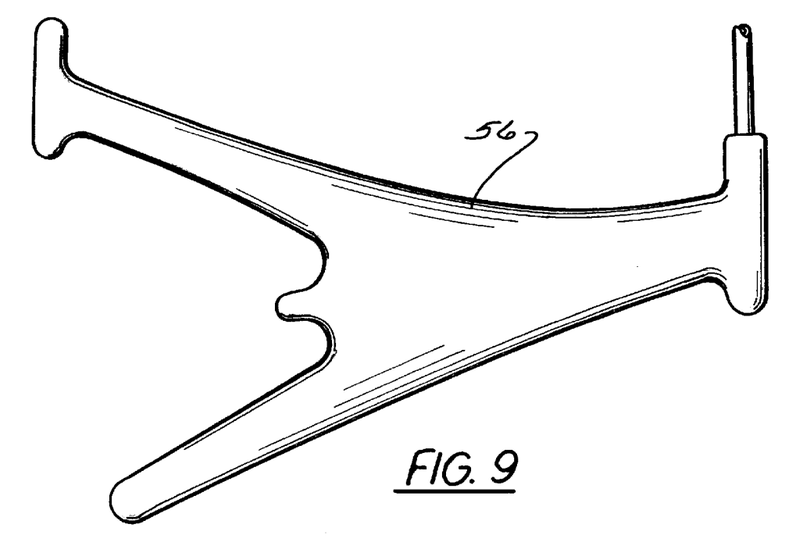
FIG. 9 is a side elevation view of an inflatable internal bladder used in molding the frame member.

Prior to closing the mold, an interior pressure bladder 56 is placed into the mold so that, when the mold is closed, the various layers of material become arranged around the bladder 56 as shown in FIG. 11. The shape of the internal pressure bladder 56 also substantially conforms to the shape of the hollow internal cavity of the mold as shown in FIGS. 9 and 10. Upon closing, the lap edges 51 of the first exterior preform 41 extend slightly over the edges of the second exterior preform 44 so that the two exterior preforms will become molded to each other to form a contiguous frame wall.

For certain high stress points in the frame, and particularly for those portions of the frame which have relatively sharp corners or to which additional components of the bicycle are attached, an extra layer of composite material, known as doublers, are added to the frame. Doublers 57, 58 and 59 for the seat post, neck of the frame, and the shock absorber attachment, for example, are shown in FIG. 3.

Once all of the layers of material from which the frame is constructed are assembled in the two mold halves, the two halves of the tooling mold 49 and 50 are then tightly clamped together, heated and the internal pressure bladder 56 is inflated to apply pressure to the laminated preforms and honeycomb assemblage, thereby forcing them against the internal walls of the molding cavity as shown in FIG. 12. The bladder 56 serves as an internal compaction device that compresses the laminated layers of material together and shapes the material into the form of the mold.

After the material is cured, the frame member 20 is removed from the mold, and the internal pressure bladder 56 is also deflated and removed. The resulting product is an exceptionally light, strong, and stiff bicycle frame, especially as compared to previous bicycle frames. The combination of the layer of honeycombed material sandwiched between interior and exterior layers of composite fibers provides a substantial savings in weight as compared to a "fiber-only" frame of the same configuration.

Of course, there is a wide array of designs and configurations of bicycle frames. Therefore, specific details of the invention as disclosed herein are not to be interpreted as limiting the scope of the invention, but merely provides a basis for the claims and for teaching one skilled in the art to variously practice and construct the present invention in any appropriate manner. Changes may be made in the details of the construction of the bicycle frame member disclosed herein, and in individual steps of the method of fabricating such a frame member, without departing from the spirit of the invention, especially as defined in the following claims.

What is claimed is:

1. A bicycle frame member comprising:
    frame walls defining a substantially hollow, unitary frame member, at least a portion of said frame walls being comprised of:
    an exterior wall section;
    an interior wall section; and,
    an intermediate layer of reinforcing material sandwiched between said interior and exterior walls sections;
    said interior and exterior wall sections each being comprised of a plurality of overlaid layers of composite material, with each individual layer of said composite material being comprised of a multiplicity of unidirectional, small diameter carbon fibers of high modulus and high tensile strength embedded in a resin matrix, said layers being arranged so that the fibers of any one layer cross over the fibers in an adjacent layer; and,
    the intermediate layer of reinforcing material comprises a synthetic honeycomb material, different froms aid interior and exterior material, composed of wall segments forming a plurality of cell structures, said wall segments being substantially perpendicular to the unidirectional fibers in said interior and exterior wall sections of said frame member.

2. The bicycle frame member of claim 1, further comprising a first layer of adhesive between the exterior wall section and layer of honeycomb material.

3. The bicycle frame member of claim 2, further comprising a second layer of adhesive between the layer of honeycomb material and the interior wall section.

4. The bicycle frame member of claim 3, wherein the adhesive is comprised of a double sided adhesive film.

5. The bicycle frame member of claim 1, wherein the interior wall section has a peripheral portion which laps over the layer of honeycomb material and said peripheral portion is joined to the exterior wall section.

6. The bicycle frame member of claim 1, wherein the layers of composite material are arranged so that the fibers in any one layer are aligned at about forty-five to about ninety degrees relative to the fibers in an adjacent layer.

7. A bicycle frame, said bicycle frame having frame walls defining a substantially hollow frame member, said frame walls being comprised of:
    an exterior wall section, said exterior wall section being comprised of first and second frame halves, each frame half being comprised of a plurality of overlaid layers of composite material, with each individual layer of said composite material being comprised of a multiplicity of unidirectional, small diameter carbon fibers of high modulus and high tensile strength embedded in a resin matrix, wherein the fibers of any one layer are aligned at about forty-five to about ninety degrees in relation to the fibers in an adjacent layer, said first second frame halves being molded together to form contiguous frame walls of said hollow frame member;
    an interior wall section, said interior wall section being likewise comprised of a plurality of overlaid layers of composite material; and,
    an intermediate wall section between said interior and exterior wall sections, said intermediate wall section being comprised of honeycomb material, different from said interior and exterior material, wherein said honeycomb material is comprised of wall segments forming a plurality of cell structures, said wall segments being oriented substantially perpendicular to the unidirectional fibers in said interior and exterior wall sections.

8. The bicycle frame member of claim 7, wherein the layer of honeycomb material is comprised of an aramid paper.

9. The bicycle frame member of claim 8, further comprising a first layer of adhesive between the exterior wall section and layer of honeycomb material.

10. The bicycle frame member of claim 9, further comprising a second layer of adhesive between the layer of honeycomb material and the interior wall section.

11. The bicycle frame member of claim 10, wherein the adhesive is comprised of a double sided adhesive film.

12. The frame member of claim 7, wherein the overlaid layers of composite material which form the interior wall section include a peripheral portion which overhangs the layer of honeycomb material, and the peripheral portion of the interior wall section is adhered to the exterior wall section.

13. A bicycle frame member comprising:

first and second frame halves, the first and second frame halves being each comprised of a number of overlaid layers of composite material, with each individual layer of composite material being comprised of a multiplicity of unidirectional, small diameter carbon fibers of high modulus and high tensile strength embedded in a resin matrix, said layers being arranged so that the fibers of any one layer cross over the fibers in an adjacent layer, each frame half forming substantially one half of said bicycle frame member plus peripheral lap edges, with the peripheral lap edges of the first fame half overlapping the lap edges of the second frame half thereby forming a unitary frame member having a substantially hollow internal cavity;

a first interior wall portion, said first interior wall portion being comprised of overlaid layers of composite material, the number of layers of composite material forming the interior wall portion being fewer than the number of layers forming the first frame half; and, a first intermediate layer of reinforcing material sandwiched between the first interior wall portion and the first frame half, the first intermediate layer of reinforcing material being comprised of a synthetic honeycomb material, different from said interior and exterior material, composed of wall segments forming a plurality of cell structures, said wall segments being substantially perpendicular to the unidirectional fibers in the first interior portion and in the first frame half.

14. The bicycle frame member of claim 13, further comprising:

a second interior wall portion, said second interior wall portion being comprised of overlaid layers of composite material, the number of layers of composite material forming the second interior wall portion being fewer than the number of layers forming the second frame half; and, a second intermediate layer of honeycomb reinforcing material sandwiched between the second interior wall portion and the second frame half.

15. The bicycle frame member of claim 14, further comprising a layer of adhesive between each frame half and each layer of honeycomb material.

16. The bicycle frame member of claim 15, further comprising a further layer of adhesive between each layer of honeycomb material and each interior wall portion.

17. The bicycle frame member of claim 16, wherein the adhesive is comprised of a double sided adhesive film.

18. The bicycle frame member of claim 13, wherein the first layer of honeycomb material is smaller in size than said first frame half, and said first interior wall portion is smaller in size than the first frame half but slightly larger than the first layer of honeycomb material thereby forming a peripheral portion that laps over the layer of honeycomb material, said peripheral portion of the first interior wall portion being bonded to an interior surface of the first frame half.

19. The bicycle frame member of claim 14, wherein the first layer of honeycomb material is smaller in size than said first frame half, and said first interior wall portion is smaller in size than the first frame half but slightly larger than the first layer of honeycomb material thereby forming a peripheral portion that laps over the layer of honeycomb material, said peripheral portion of the first interior wall portion being bonded to an interior surface of the first frame half; and, the second layer of honeycomb material is smaller in size than said second frame half, and said second interior wall portion is smaller in size than the second frame half but slightly larger than the second layer of honeycomb material thereby forming a peripheral portion that laps over the second layer of honeycomb material, said peripheral portion of the second interior wall portion being bonded to an interior surface of the second frame half.

20. The bicycle frame member of claim 13, wherein the layers of composite material are arranged so that the fibers in any one layer are aligned at about forty-five to about ninety degrees relative to the fibers in an adjacent layer.

21. The bicycle frame member of claim 13, wherein the layer of honeycomb material is comprised of an aramid paper.

22. A bicycle frame member comprising:

first and second frame halves, the first and second frame halves being each comprised of a number of overlaid layers of composite material, with each individual layer of composite material being comprised of a multiplicity of unidirectional, small diameter carbon fibers of high modulus and high tensile strength embedded in a resin matrix, said layers being arranged so that the fibers of any one layer cross over the fibers in an adjacent layer, each frame half forming substantially one half of said bicycle frame member plus peripheral lap edges, with the peripheral lap edges of the first fame half overlapping the lap edges of the second frame half thereby forming a unitary frame member having a substantially hollow internal cavity;

a first interior wall portion, said first interior wall portion being comprised of overlaid layers of composite material;

a first intermediate layer of reinforcing material sandwiched between the first interior wall portion and the first frame half, the first intermediate layer of reinforcing material being comprised of a synthetic honeycomb material, different from said interior and exterior material, composed of wall segments forming a plurality of cell structures, said wall segments being substantially perpendicular to the unidirectional fibers in the first interior portion and in the first frame half; and said first layer of honeycomb material is smaller in size than said first frame half, and said first interior wall portion is smaller in size than the first frame half but slightly larger than the first layer of honeycomb material thereby forming a peripheral portion that laps over the layer of honeycomb material, said peripheral portion of the first interior wall portion being bonded to an interior surface of the first frame half.

23. The bicycle frame member of claim 22, further comprising:

a second interior wall portion, said second interior wall portion being comprised of overlaid layers of composite material;

a second intermediate layer of honeycomb reinforcing material sandwiched between the second interior wall portion and the second frame half; and, said second layer of honeycomb material is smaller in size than said second frame half, and said second interior wall portion is smaller in size than the second frame half but slightly larger than the second layer of honeycomb material thereby forming a peripheral portion that laps over the second layer of honeycomb material, said peripheral portion of the second interior wall portion being bonded to an interior surface of the second frame half.

24. The bicycle frame member of claim 22, wherein the number of layers of composite material forming the first interior wall portion is fewer than the number of layers forming the first frame half.

25. The bicycle frame member of claim 23, wherein the number of layers of composite material forming the first interior wall portion is fewer than the number of layers forming the first frame half, and, the number of layers of composite material forming the second interior wall portion is fewer than the number of layers forming the second frame half.

26. The bicycle frame member of claim 22, wherein the layers of composite material are arranged so that the fibers in any one layer are aligned at about forty-five to about ninety degrees relative to the fibers in an adjacent layer.

27. The bicycle frame member of claim 22, wherein the honeycomb material is comprised of an aramid paper.

28. The bicycle frame member of claim 23, further comprising a layer of adhesive between each frame half and each layer of honeycomb material.

29. The bicycle frame member of claim 28, further comprising a further layer of adhesive between each layer of honeycomb material and each interior wall portion.

30. The bicycle frame member of claim 29, wherein the adhesive is comprised of a double sided adhesive film.

* * * * *

UNITED STATES PATENT AND TRADEMARK OFFICE
CERTIFICATE OF CORRECTION

PATENT NO. : 6,109,638
DATED : August 29, 2000
INVENTOR(S) : James E. Colegrove

It is certified that error appears in the above-identified patent and that said Letters Patent is hereby corrected as shown below:

Column 8, line 16, delete "froms aid" and substitute -- from said --.

Column 8, line 50, after "first" insert -- and --.

Signed and Sealed this

Twenty-fourth Day of April, 2001

Attest:

NICHOLAS P. GODICI

*Attesting Officer*      Acting Director of the United States Patent and Trademark Office